United States Patent [19]

Pickles

[11] 4,238,991
[45] Dec. 16, 1980

[54] THREE-POSITION ACTUATOR

[75] Inventor: Joseph Pickles, Birmingham, Mich.

[73] Assignee: Ferro Manufacturing Corporation, Detroit, Mich.

[21] Appl. No.: 1,057

[22] Filed: Jan. 5, 1979

[51] Int. Cl.³ .............................................. F01B 11/02
[52] U.S. Cl. ...................................... 92/85 A; 92/94; 92/100; 267/165
[58] Field of Search .................. 92/94, 130 B, 130 D, 92/100, 85 A, 132; 267/165, 170, 177, 164

[56] References Cited

U.S. PATENT DOCUMENTS

| | | | |
|---|---|---|---|
| 2,181,954 | 12/1939 | Wallat | 267/170 |
| 3,194,497 | 7/1965 | Thorburn | 92/85 A |
| 3,230,024 | 1/1966 | Gika | 267/177 |
| 3,648,571 | 3/1972 | Burgess | 92/100 |
| 3,709,461 | 1/1973 | Johnson | 251/58 |
| 3,737,155 | 6/1973 | Karlan | 267/165 |

OTHER PUBLICATIONS

Product Engineering, Jan. 2, 1961, p. 8.

Primary Examiner—Abraham Hershkovitz
Attorney, Agent, or Firm—Whittemore, Hulbert & Belknap

[57] ABSTRACT

A three-position actuator comprising a casing having a diaphragm dividing the casing into separate pressure chambers, an actuating rod connected to said diaphragm and resilient means urging said diaphragm in one direction. One of the resilient means comprise a movable spring seat with a compression spring interposed between the seat and a plate connected to the diaphragm. The seat and plate are in turn interconnected by a single flat connector strap limiting separation between the plate and diaphragm to an amount approximately one-half the total travel of the diaphragm. In one embodiment of the invention the spring seat is connected to a separate diaphragm. In the preferred embodiment of the invention, only a single diaphragm is employed and the spring seat floats in the casing, with its separation from the diaphragm limited by the connector strap.

18 Claims, 6 Drawing Figures

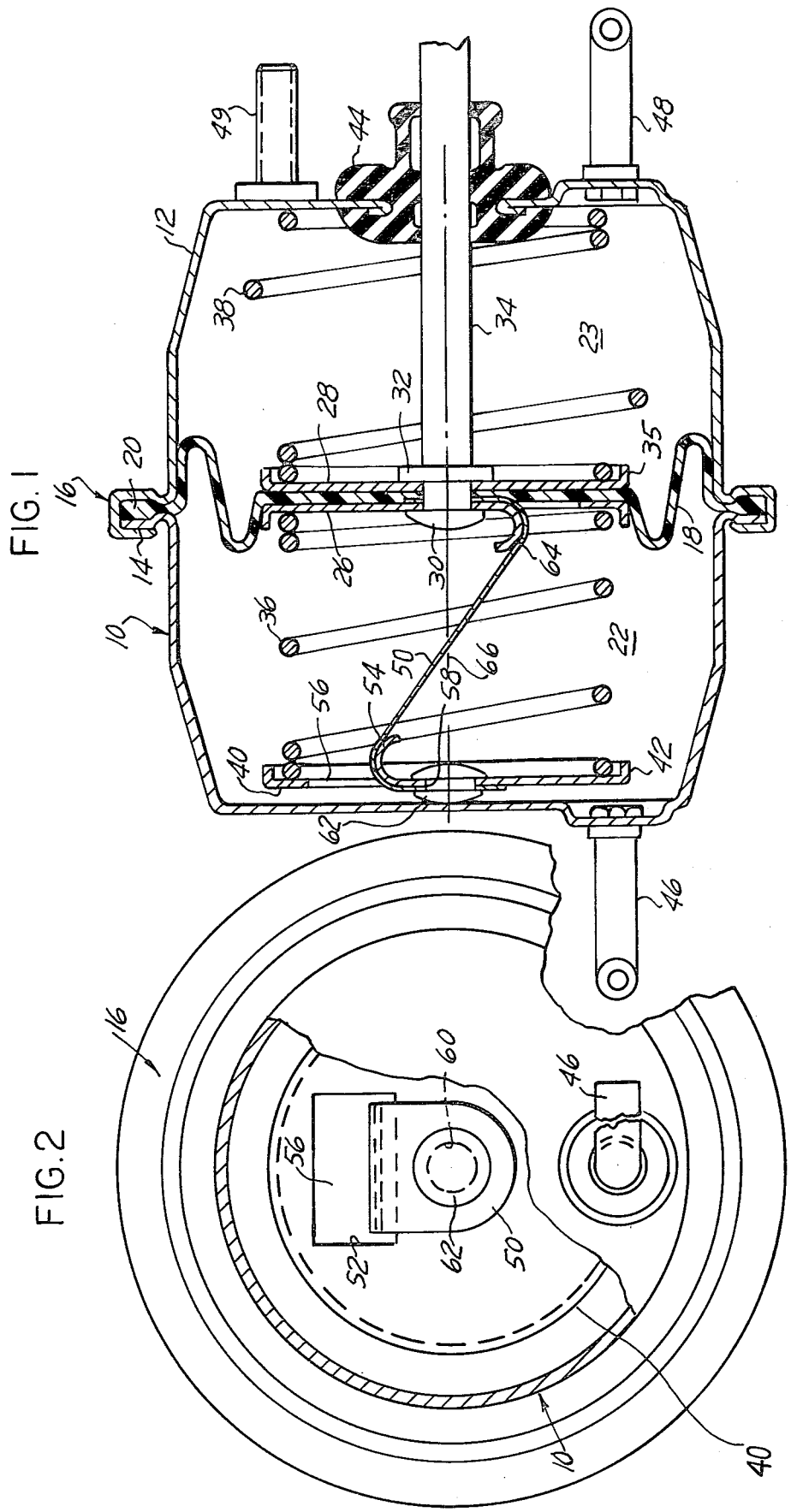

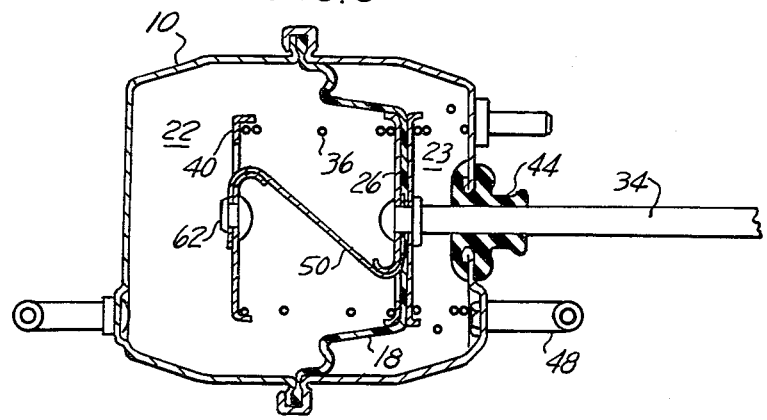
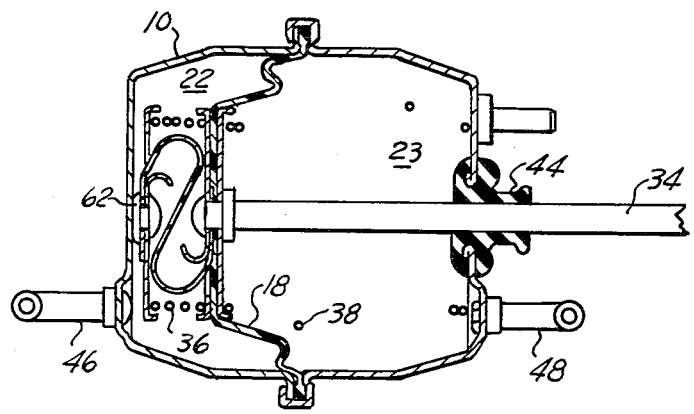
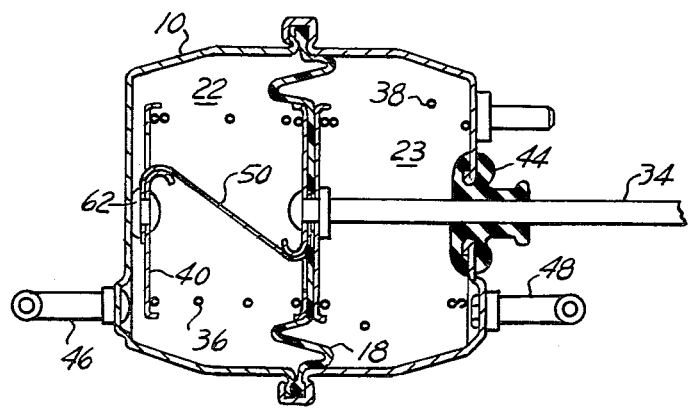

THREE-POSITION ACTUATOR

BACKGROUND OF THE INVENTION

The three-position actuator is intended for use with a movable control element, such as a valve having three control positions. An example of such use is in an automotive vehicle, where the valve may be in the heating-cooling system. The actuator is designed to operate from manifold vacuum, where pressure differentials between manifold vacuum and atmospheric pressure are used.

The first embodiment of the invention relates to a specific improvement in a flexible connector adapted to interconnect a movable spring seat and a plate connected to the central portion of a flexible diaphragm. The flexible connector is in the form of a thin plastic strap which conveniently may be polyethylene terephthalate available under the Dupont trademark MYLAR. The strap is substantially inextensible but is highly flexible so that it does not oppose approach between the plate and seat.

In order to protect the flexible plastic strap, rigid curved guide means are provided by the plate and seat engageable by portions adjacent the ends of the strap, so that as it is subjected to tension, end portions conform to curved guides, which prevent stress concentration.

Preferably the construction by which the ends of the straps are connected to the flat plate and seat members comprises a central opening in the associated member and a tab forming cut-out adjacent to but spaced laterally from the central opening. The cut-out is formed so that the tab, when bent into arcuate configurations toward the other member and toward the opening, forms a second opening in the member through which the end portion of the strap is extended. This end portion of the strap is provided with an opening and is brought into flat surface-to-surface contact with the surface of the member remote from the other member. The end portion of the strap is then firmly attached to the outer surface of the member by fastening means, such as a rivet which passes through the central opening in the member and in the end portion of the strap. The rivet connecting one end of the strap to the associated member serves to connect a member with an actuating rod, and in a preferred embodiment of the invention, the rivet is provided as an integral portion of the inner end of the rod.

As thus far described the spring seat may be mounted on a second diaphragm generally similar to the first diaphragm and movable in the chamber as a result of pressure differentials applied to opposite sides of the second diaphragm.

However, in a preferred embodiment of the invention only a single diaphragm is provided in the casing and divides the casing into two sealed pressure chambers, each of which is provided with a connection to an external pressure source, ordinarily a source of subatmospheric pressure or vacuum. In this embodiment of the invention an actuating rod extends into the casing and has its inner end connected to flat plate means which in turn is connected to the central portion of the diaphragm. A first compression spring is provided interposed between the end of the casing through which the actuating rod is movable and the plate. At the other side of the diaphragm there is provided a floating spring seat which is interconnected to the plate by a connector adapted to limit separation between the spring seat and plate but to provide no forces opposing approach between the seat and plate. The connector in this embodiment of the invention may be, and preferably is, the improved connector as previously described.

Prior U.S. Pat. No. 3,709,461 to Johnson, discloses a three position actuator using two diaphragms and essentially different means for limiting separation between the diaphragms, one of which serves as a spring seat.

BRIEF DESCRIPTION OF THE DRAWINGS

FIG. 1 is a longitudinal sectional view through a preferred embodiment of the invention.

FIG. 2 is an end view, partly in section, of the structure shown in FIG. 1.

FIGS. 3, 4 and 5 are somewhat diagrammatical views showing the embodiment of FIGS. 1 and 2 in the three different positions.

DETAILED DESCRIPTION

Figure 6:
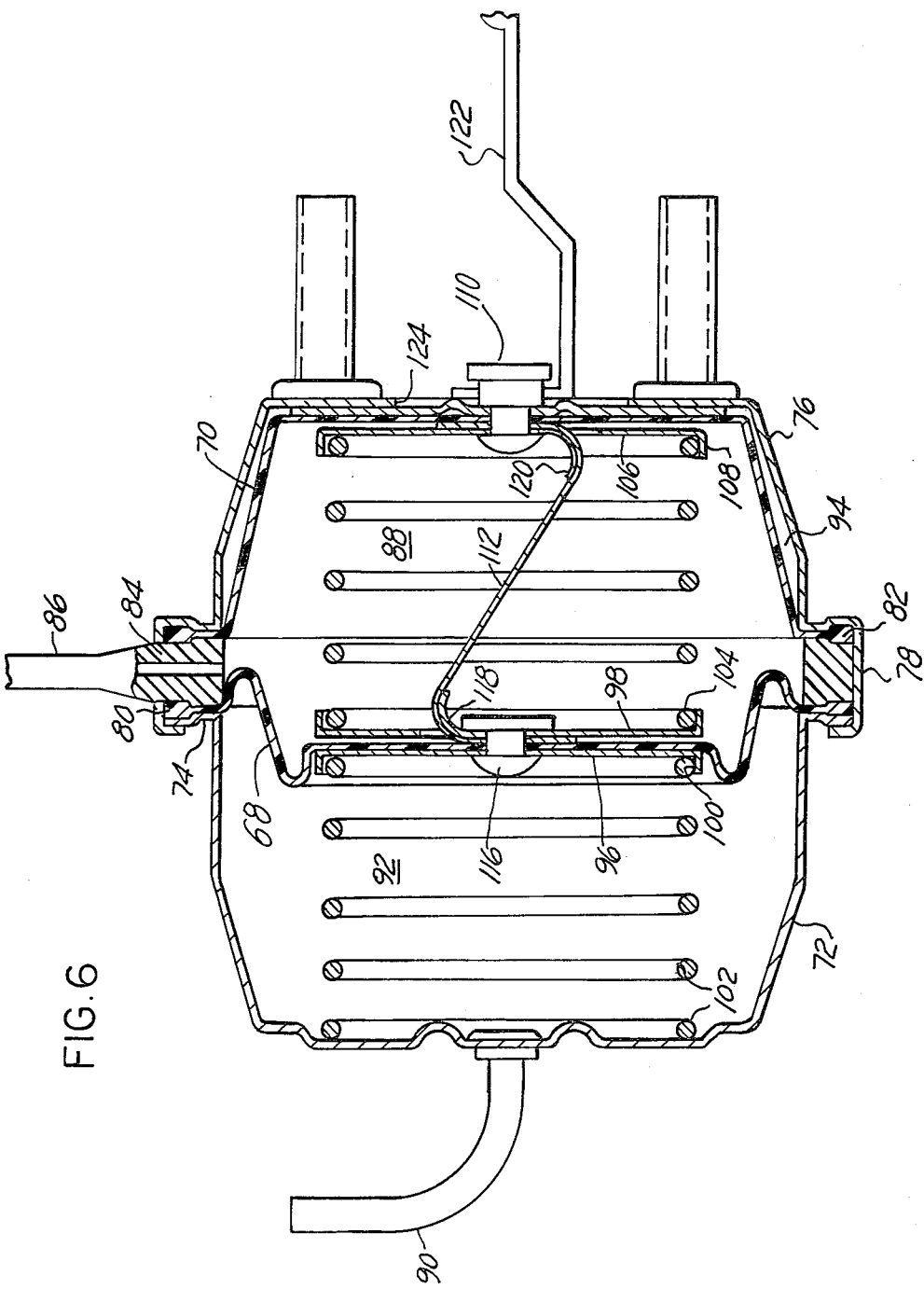
FIG. 6 is a view similar to FIG. 1 showing a second embodiment of the invention.

Referring first to FIG. 1, the three-position actuator comprises a two-part casing of generally cup-shaped parts 10 and 12. The casing part 10 includes a radially extending peripheral flange 14 and the casing part 12 includes a peripheral flange portion 16 adapted to be bent over the flange 14 to complete the casing as is apparent from an inspection of the drawings.

Within the casing is a flexible diaphragm 18 having a thickened bead 20 around its periphery which is firmly gripped between flanges 14 and 16 thus dividing the interior of the casing and the two pressuure chambers 22 and 23. The central portion of the diaphragm 18 is engaged at opposite sides by flat rigid plates 26 and 28 retained in assembled relationship between a rivet head 30 and a flange 32 formed on a movable actuating rod 34. Plates 26 and 28 are provided with axially extending flanges 35 adapted to hold coil compression springs 36 and 38 in operating position. A floating spring seat 40 is provided in the chamber 22 and has a peripheral flange 42 extending toward the plate 26 and adapted to retain the compression spring 36 in operating position.

The operating rod 34 extends through a guide bushing and seal 44 adapted to provide an effective seal between the chamber 23 and atmosphere.

Casing part 10 is provided with a tubular conduit 46 and casing part 12 is provided with a similar conduit 48 adapted to connect the chambers 22 and 23 respectively to pressure sources. In the specific three-position actuator disclosed herein, it is contemplated that the conduits 46 and 48 will be connected to external valves which in turn connect the chambers 22 and 23 selectively to atmosphere or manifold vacuum as provided in an automotive vehicle. Preferably threaded studs, one of which is illustrated at 49, are suitably attached to the exterior of the casing, as for example by welding.

Means are provided connecting the plates 26, 28 to spring seat 40 and this means comprises a flexible strap 50 which in a preferred embodiment of the invention is about 0.5 inches in width and has a thickness of 0.005–0.010 inches. A suitable plastic material for this strap, which exhibits adequate strength, substantial dimensional stability and high flexibility is polyethylene terephthalate which is available under the Dupont trademark MYLAR. Such a strap of course is essentially non-resilient and while it limits separation between elements to which its ends are secured, it does not oppose any appreciable resistance to approach between such elements.

An important aspect of the present invention is the particular mounting means connecting the ends of the strap 50 to plate 26 and spring seat 40, and since structure is substantially identical as provided on the plate 26 and spring seat 40, it will be described in detail only in connection with spring seat 40.

A generally U-shaped tab forming cut 52 best seen in FIG. 2 is made in the flat central portion of the spring seat 40 and the tab 54 formed thereby is pressed out of the plane of the spring seat 40 and formed into a generally arcuate configuration which as clearly seen in FIG. 1, extends toward plate 26 and then radially inwardly toward the center of flat seat 40. Pressing the tab 54 to the position illustrated in FIG. 1, leaves an opening 56 in the spring seat and the end portion of the strap 50 is extended through the opening. The spring seat 40 includes a central opening 58 and the end of the strap 50 includes a corresponding opening 60. When the end of the strap 50 is passed through the opening 56 it is registered with the opening 58 at the rear or outer surface of seat 40 and is firmly attached to the spring seat 40 by rivet 62.

As before noted, a substantially equivalent construction is provided forming a similar curved tab 64 at the side of the plate 26 confronting spring seat 40 except that rod 34 and plate 28 are connected to plate 26 by rivet 30.

With this construction it will be noted that the strap 50 is bent around the curved surface of the tabs 54 and 64 so that it is not subjected to localized stress. Further, the tension applied to the strap 50 is supported by the clamped end portion 50 of the strap between the rivet 62 and the outer side of the spring seat 40. In addition it will be observed that the strap 50 extends diagonally across an axial plane of the casing 10, 12, such plane being indicated by the construction line 66. This results in uniform and predictable flexion of the strap 50 as relative approach takes place between plate 26 and spring seat 40 from the position illustrated in FIG. 1.

Referring now to FIGS. 3, 4 and 5, there are illustrated the three positions assumed by the operating rod 24 relative to the casing. FIG. 5, which corresponds to the position of parts seen in FIG. 1 is the intermediate position assumed by the operating rod 24 when both pressure chambers 22 and 23 are equally pressurized.

This intermediate position will normally be assumed when the external valves connect the conduits 46 and 48 to atmosphere. At this time, of course, the position of the central plate supported portion of the diaphragm 18 is determined by the actions of the springs 36 and 38. It will be observed that the spring seat 40 through the rivet 62 engages the end of casing part 10 so that the forces applied by the springs 36 and 38 are balanced.

If now conduit 48 is connected through the external valve to a source of manifold vacuum, pressure in the chamber 23 falls and atmospheric pressure in chamber 22 shifts the diaphragm 18 to the right as seen in FIG. 3. At this time the floating spring seat 40 has moved away from the end wall of casing part 10 and accordingly the spring 36 is confined between the intermediate portion of the diaphragm or the plate 26 and the spring seat 40 by tension applied to the flexible strap 50. Accordingly, the operating rod 34 assumes the extended position determined by the reduced pressure or vacuum between the chamber 23, the force of spring 23, and atmospheric pressure acting within the chamber 22.

Referring now to FIG. 4 there is illustrated the retracted position of the operating rod 24 which is attained when the conduit 46 is connected through its external valve to the source of reduced pressure or vacuum. At this time the diaphragm 18 assumes the illustrated position as a result of atmospheric pressure existing within the chamber 23 as communicated through the valve controlling conduit 48, the reduced pressure or vacuum existing within the chamber 22 and the forces applied to the central portion of the diaphragm by springs 36 and 38.

It will be understood that the guide bushing and seal 44 need not effect a perfect seal since the source of manifold vacuum to which the conduit 48 is connected will maintain the chamber 23 at a value at least closely approximating the manifold vacuum.

With this construction it will be observed that a single flexible diaphragm is employed, thus resulting in substantial economies.

Referring now to FIG. 6 there is illustrated a three-position actuator which differs from the actuator previously described by employing two flexible diaphragms 68 and 70. In this embodiment of the invention the casing is formed by a part 72 having a radially extending flange 74 and a casing part 76 having a flange 78 adapted to be bent over the flange 74 to complete the assembly. The diaphragms 68 and 70 have peripheral beads 80 and 82 and intermediate these beads is a spacing ring 84 having external conduit 86 for connection to a valve controlled source of manifold vacuum or atmosphere. The spacer 84, of course, includes a passage extending to the interior of the casing and specifically to a pressure chamber 88 formed between the diaphragms 68 and 70.

Casing part 72 includes a conduit 90 adapted to be connected through an external valve selectively to the source of manifold vacuum or atmosphere and communicates within the casing to a pressure chamber 92 defined between the cup-shaped casing part 72 and the diaphragm 68.

A third pressure chamber 94 is provided within the casing part 76 by the diaphragm 70 which is always connected to atmospheric pressure.

The intermediate portion of the diaphragm 68 is supported between plates 96 and 98, each having peripheral flanges 100 to retain compression springs 102 and 104 in operating position.

The diaphragm 70 has connected to its central portion a flat spring seat 106, provided with a flange 108 adapted to retain the spring 104 in operating position.

In this embodiment of the invention it will be observed that the spring seat 106 mechanically connected to the central portion of the diaphragm 70 by rivet means indicated generally at 110. The diaphragm supported spring seat 106 is connected to the plate or spring seat 98 by a flexible strap 112 which may be identical with the strap 50 previously described. Moreover the ends of the strap 112 extend through an opening in the plates 98 and 106 and are riveted to the rear of such plates by the rivet construction 110 and the rivet 116. Also the plates 98 and 106 are provided with the curved tape support tabs 118 and 120 which are formed as described in connection with the tabs 54 and 64 in the previously described embodiment of the invention.

The central portion of the diaphragm 70 and the spring seat 106 are connected by the rivet means 110 to the external operator 122 which extends through an opening 124 formed in the end wall of the casing part 76, so that the chamber 94 is always subjected to atmospheric pressure, as previously noted.

With the foregoing construction it will be evident that the position of rod 122 in FIG. 6 is the extended position which is attained when external conduits 86 and 90 are connected to atmosphere. At this time diaphragm 68 assumes the illustrated position as a result of forces applied thereto by spring 102 and diaphragm 70 assumes the illustrated position as the result of forces applied thereto by the compression springs 104. If now vacuum is applied to the chamber 88, atmospheric pressure in the chamber 94 acting against the spring 104 shifts the central portion of the diaphragm and the spring seat 106 to the left into juxtaposition of the central portion of the diaphragm 68, thus moving the operating rod 122 to its intermediate position.

If while vacuum continues to be applied to the chamber 88, vacuum is also applied to the chamber 92 through conduit 90, the diaphragm 68 is shifted to the left as seen in FIG. 6 by spring 104 so that plate 106 and operating rod 122 assumes the fully retracted position.

The flexible strap 112 limits separation between central portion of the two diaphragms to an amount approximately equal to one-half of the total travel of the central portion of the diaphragm 70.

It will be observed that the embodiments of the invention illustrated in FIGS. 1 and 6 both comprise a casing, a flexible diaphragm (18 in FIG. 1, 70 in FIG. 6), a flat rigid plate connected to the central portion of the diaphragm (the plate 26 or 28 of FIG. 1, and the plate 106 of FIG. 6), a spring seat movable in the casing toward and away from the plate connected to the diaphragm (the spring seat 40 in FIG. 1 and the spring seat 98 in FIG. 6), and the single flexible strap having its end portion connected to the seat and plate (the strap 50 of FIG. 1 and 112 of FIG. 6).

I claim:

1. A three position fluid pressure operated actuator comprising a casing, a single flexible diaphragm in said casing having its periphery connected around a zone intermediate the ends of said casing and dividing the interior of said casing to a pair of pressure chambers, flat plate means connected to the central portion of said diaphragm leaving a flexible annular portion between said plate means and the periphery of said diaphragm, said plate means providing spring seats at opposite sides of said diaphragm, a first compression spring in one of said chambers connected between one end of said casing and the adjacent spring seat urging said plate means in a first direction, spring means in said other chamber comprising a floating spring seat movable therein between a position at the other end of said casing and a position spaced inwardly therefrom, a compression spring acting between said floating spring seat and the spring seat connected to the adjacent side of said diaphragm, connector means comprising a single flexible non-resilient strap connected between said last mentioned spring seat and said floating spring seat acting to limit separation between said seat and plate to approximately one-half of the total travel of said diaphragm in said casing, a rigid actuator rod connected at one end to said diaphragm and extending through an opening at one end of said casing, and fluid pressure connections to said pressure chambers.

2. An actuator as defined in claim 1, in which said floating spring seat and the adjacent spring seat connected to said diaphragm have central aligned openings and tab-forming cuts adjacent said openings, the tabs formed by said cuts being bent toward each other to provide off-center openings and curved rigid strap guides, the ends of said strap extending around said guides and through said off-center openings, and being secured to opposite sides of said seats.

3. An actuator as defined in claim 2, said tabs being located toward opposite edges of said seats whereby said strap when said seats are at maximum separation, extends diagonally across the axis determined by said central aligned openings.

4. An actuator as defined in claim 3, in which the end portions of said strap have openings in alignment with the central openings in said plate and seat, the end portions of said strap extending through the off-center openings formed in said seats and thence into contact with the remote sides of said seats to position the openings in the end portions of said strap into alignment with the central openings in said seats, and a fastening element extending through the aligned opening at each end portion of said strap and the central opening of the adjacent seat.

5. An actuator as defined in claim 4, in which the fastening elements are rivets and in which the rivet extending through the central opening in the seat connected to said diaphragm connects the end portion of the actuator rod to said seat.

6. A three position fluid pressure operated actuator comprising a casing, a flexible diaphragm having its periphery connected around an intermediate zone of said casing and dividing said casing into separate pressure chambers, said diaphragm having a flat rigid plate connected to the central portion thereof, a spring seat movable in said casing toward and away from said plate, a spring interposed between said seat and said plate, a single flexible non-resilient strap connected at its end portions to central portions of said seat and plate to limit separation therebetween while permitting substantially free relative movement therebetween into substantial juxtaposition.

7. An actuator as defined in claim 6, in which said plate and seat have central aligned openings and tab-forming cuts adjacent said openings, the tabs formed by said cuts being bent toward each other to provide curved rigid guides and off-center openings which receive end portions of said strap.

8. An actuator as defined in claim 7, in which said strap is formed of a polymeric material.

9. An actuator as defined in claim 8, in which said strap is 0.005–0.010" thick and about 0.5" wide.

10. An actuator as defined in claim 7, said tabs being located toward opposite edges of said plate and seat, whereby said strap when said plate and seat are at maximum separation, extends diagonally across the axis determined by said central aligned openings.

11. An actuator as defined in claim 10, in which said strap is formed of a polymeric material.

12. An actuator as defined in claim 11, in which said strap is 0.005–0.010" thick and about 0.5" wide.

13. An actuator as defined in claim 10, in which the end portions of said strap have openings in alignment with the central openings in said plate and seal, the end portions of said strap extending through the off-center openings formed in said plate and seat by bending said tab to its curved shape and thence in contact with the remote sides of said plate and seat to position the openings in the end portions of said strap into alignment with the central openings in said plate and seat, and a fastening element extending through the aligned opening at each end portion of said strap and the central opening of the adjacent plate or seat.

14. An actuator as defined in claim 13, in which said strap is formed of a polymeric material.

15. An actuator as defined in claim 14, in which said strap is 0.005–0.010" thick and about 0.5" wide.

16. An actuator as defined in claim 13, in which the fastening elements are rivets and in which the rivet extending through the central opening in said plate connects the end portion of an elongated operating rod to said plate.

17. An actuator as defined in claim 16, in which said strap is formed of a polymeric material.

18. An actuator as defined in claim 17, in which said strap is 0.005–0.010" thick and about 0.5" wide.

* * * * *